March 22, 1932. H. W. ALDEN ET AL 1,850,861
BRAKE SYSTEM
Filed Nov. 18, 1927 3 Sheets-Sheet 2
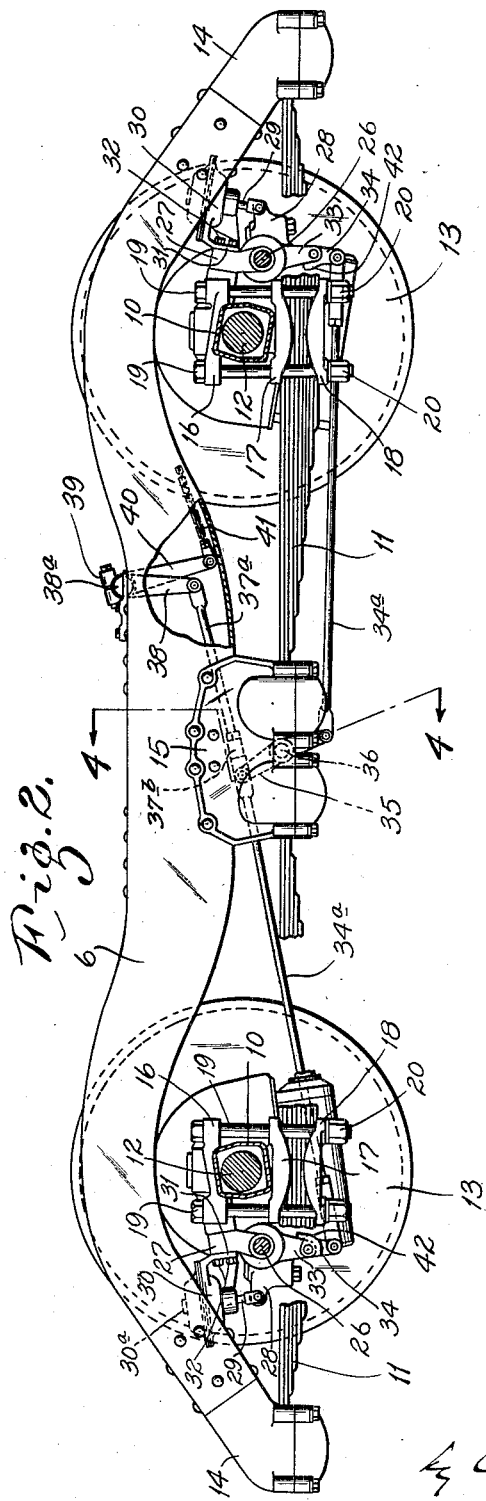
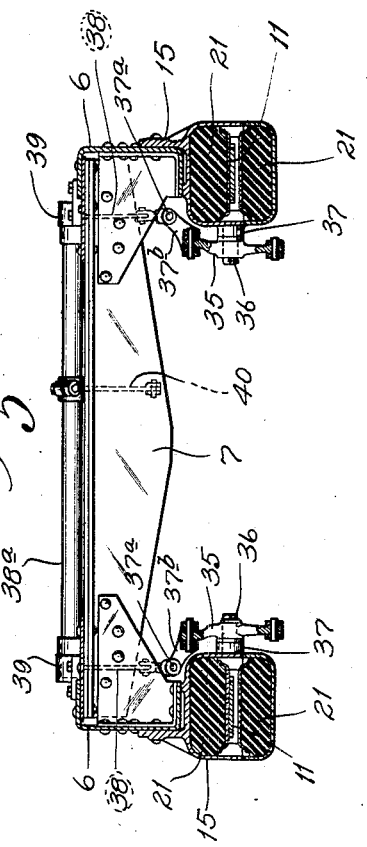

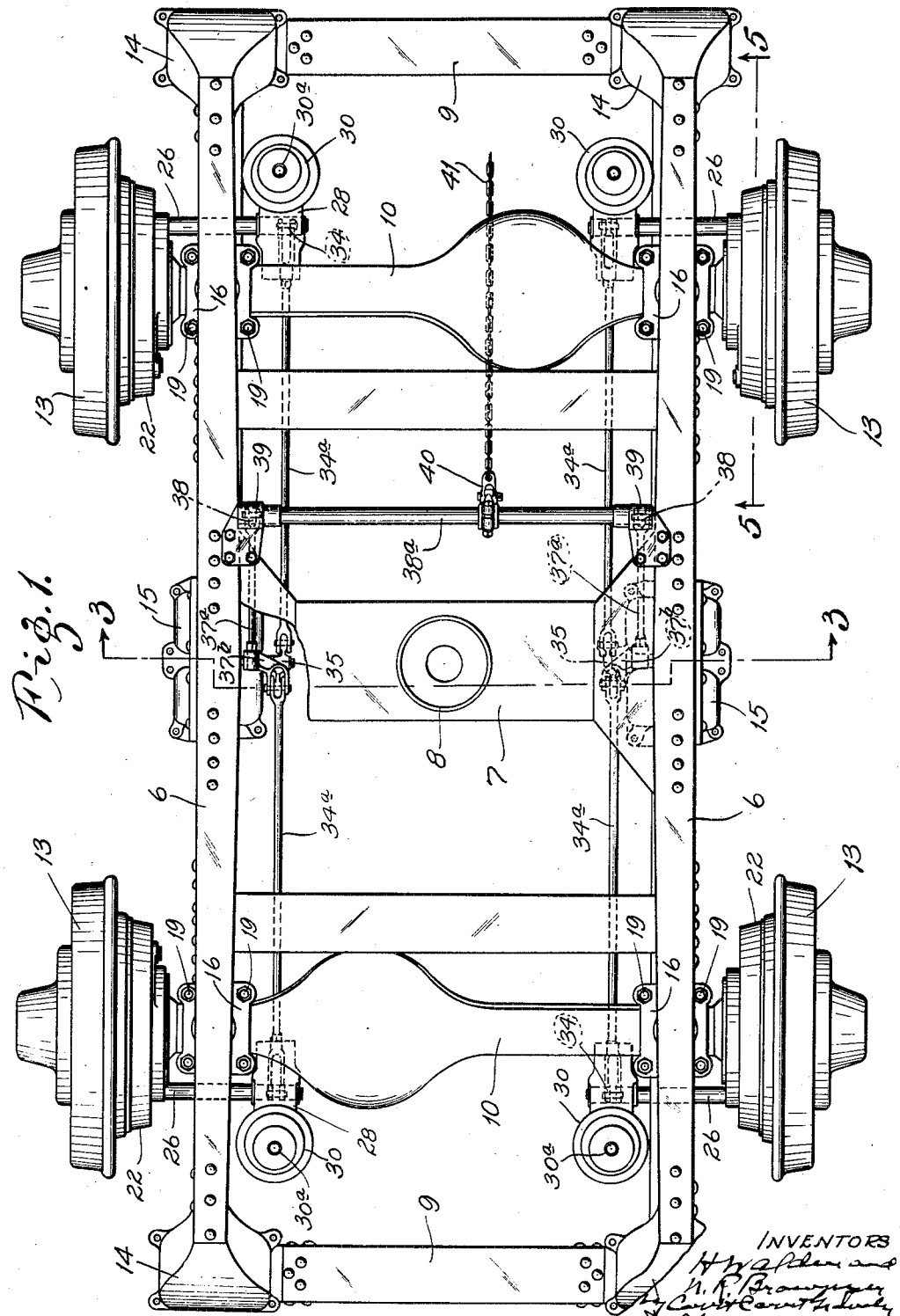

March 22, 1932.  H. W. ALDEN ET AL  1,850,861
BRAKE SYSTEM
Filed Nov. 18, 1927  3 Sheets-Sheet 3

INVENTORS
Herbert W. Alden and
Nelson R. Brownyer
by their ATTORNEYS

Patented Mar. 22, 1932                                           1,850,861

UNITED STATES PATENT OFFICE

HERBERT W. ALDEN AND NELSON R. BROWNYER, OF DETROIT, MICHIGAN, ASSIGNORS TO THE TIMKEN-DETROIT AXLE COMPANY, OF DETROIT, MICHIGAN, A CORPORATION OF OHIO

BRAKE SYSTEM

Application filed November 18, 1927. Serial No. 234,095.

This invention relates to brake systems for street cars. One of its principal objects is to provide a simple, strong and compact construction whereby air brakes may be used in connection with street car wheels. Another principal object is to provide means whereby brakes, which are normally actuated by air pressure, may be applied by hand. Other objects are to devise practical means for using expanding brakes in connection with car wheels, and to obtain advantages hereinafter appearing. The invention consists in the construction, combinations and arrangements of parts hereinafter described and claimed.

In the accompanying drawings wherein like reference numerals refer to like parts wherever they occur, Fig. 1 is a plan view of a car truck conforming to our invention;

Fig. 2 is a side elevation of the truck, the axles being shown in section;

Fig. 3 is a vertical cross section through the truck on the line 3—3 in Fig. 1;

Fig. 4 is a similar section on the line 4—4 in Fig. 2; and

Fig. 5 is a detail section on the line 5—5 in Fig. 1, illustrating the mounting of the brake diaphragm and its connection with the brake shoes.

The car truck illustrated in the accompanying drawings comprises side frames 6 rigidly connected together about midway of their length by a bolster 7, which is provided with a suitable center bearing 8, and at their ends by end members 9. It also comprises axle housings 10, springs 11 for holding the axle housings in proper relation to the side frames and a live axle 12 in each housing with car wheels 13 on its ends.

The middle portion of each side frame 6 is depressed; and from this middle portion the side frame inclines upwardly to a maximum height above the axle and thence beyond and downwardly below the level of the axle at each end of said frame. Each end of the side frame is provided with a fitting 14 adapted to receive the outer ends of the supporting springs 11; and the middle portion of each side frame is provided with a fitting 15 that depends therefrom and is adapted to receive the inner ends of said springs. The springs 11 are leaf springs of common type and are supported from the bottom of the axle housing by saddle plate 16 mounted on top of the axle housing, a saddle block 17 bearing against the bottom of said housing and seated on top of the leaf springs, and a saddle block 18 which bears against the bottom of said springs. Said saddle blocks are firmly clamped to the axle housing and to the spring by means of bolts 19 which extend through the saddle blocks and are threaded at their lower ends to receive nuts 20. The end and center fittings 14 and 15, respectively, of the side truck frames are preferably provided with chambers adapted to receive rubber blocks 21, which form cushion supports for the outer and inner ends, respectively, of the springs.

Each of the car wheels 13 has its hub portion rigidly secured to the axle and is provided on its inner face with a circular brake drum 22 which is concentric with the axle and extends towards the longitudinal center line of the truck. Rigidly mounted on each end of each axle housing 10 is a suitable brake spider 23 which serves as a dust guard for the brake drum and as a support for an internal brake located within said drum and adapted for cooperation therewith. In the construction shown, the brake consists of a pair of arcuate shoes 23a pivotally supported at one end on each said brake spider 23 and adapted to be spread apart into engagement with the inner periphery of the brake drum of the adjacent wheel by means of a suitable cam member 24 located between their free ends. As shown in the drawings, the brake shoes are normally held out of engagement with the brake drum by means of coil springs 25 having one end secured to the brake spider and the other end secured to the brake shoes.

The cam member 24 is secured to the outer end of a horizontal rock shaft 26, which is rotatably supported at its outer end in the brake spider and at its inner end in spaced bearings depending from a bracket 27 bolted to the outer side face of the axle housing. A rock member 28 or arm has its hub portion fixed to the rock shaft, between the spaced bearings for the inner end thereof; and the outer end of said arm is pivotally connected to the lower end of a push rod 29, which, in turn, is connected to a flexible diaphragm which is mounted in a closed chamber of a brake cylinder 30. Compressed air from a suitable source under control of the operator is admitted to the upper end of the diaphragm chamber of the brake cylinder through a suitable supply pipe 30a. As shown in the drawings, the brake cylinder 30 is provided with an offset portion 31 that is fastened flatwise against the outer face of the bracket 27, which supports the inner end of the rock shaft, by means of the bolts 32 which secure said bracket to the outer face of the axle housing. By the arrangement described, pressure admitted to the diaphragm chamber distends the diaphragm thereof and movement of the diaphragm is transmitted through the push rod 29 and the rock arm 28, to the rock shaft 26 and the cam 24 thereon, thereby causing said cam to spread apart the ends of the brake shoes 23a, against which it bears, and thereby set the brake. When the pressure is released the brake shoes are pulled back to their normal position by the springs 25.

In addition to being actuated by air pressure, as hereinbefore described, the several brakes can be actuated by hand. For this purpose, the hub of the rock arm 28 on the rock shaft 26 of said brake is provided with a depending radial rock arm 33, which is pivotally connected to the upper end of a link 34, whose lower end is pivotally connected to the outer end of a rod 34a, which extends longitudinally of the truck adjacent to the inner side of the truck side frame and is pivotally connected at its inner end to one arm of a rock lever 35 fixed to a horizontal rock shaft 36 journaled in a bearing 37 provided therefor on the inner face of the fitting 15 which secures the inner ends of the springs 11 to the middle portion of the truck side frame.

As shown in the drawings, there are two of the rock levers 35 located one on each side frame, and one arm of a rock lever 35 is pivotally connected to the pull rod that controls the front brake and the other arm of said rock lever is pivotally connected to the inner end of the pull rod that leads to the brake on the same side. The upper arm of each of the rock levers 35 has one end of a link 37b pivotally secured thereto whose other end is connected to one end of a rod 37a which in turn is pivotally connected to the free end of a rock arm 38 fixed to a rock shaft 38a that extends crosswise of the truck from one side to the other where it is rotatably supported in bearings 39 secured to the side frames. The rock shaft 38a is provided adjacent to the longitudinal center line of the truck with an operating arm 40 which is connected to the brake shaft of the car by a chain 41. By this arrangement, the four brakes may be actuated simultaneously by manipulation of the operating lever 40 which is located close to the pivot point of the truck so that the brakes are not materially affected when the car rounds a curve.

It is noted that the actuation of the brakes by the air system does not involve any actuation of the manually operated system and, vice versa, the actuation of the manually operated system does not involve any portion of the air actuated system. This is due to a lug or abutment 42 on the link 34, which connects the pull rod 34a to the rock arm 33 on the rock member 28 which rotates the cam shaft for each brake. The lug 42 is located in front of the depending rock arm 33 of the member 28 in position to abut against the front face of said arm when the pull rod is pulled inwardly to apply the brake. When the brake is actuated by the air system, however, the upper end of the link 34 moves with the rock arm 33 of the member 28 and does not impart any endwise movement to the pull rod of the brake.

Obviously, the hereinbefore described arrangement admits of considerable modification without departing from the invention; therefore, we do not wish to be limited to the precise arrangement shown and described.

What we claim is:

1. A street car truck comprising side frames, a center bearing, axles and wheels on the ends of said axles and provided with brake drums, fluid operated brake members cooperating with said brake drums, and manually operated means mounted entirely on said truck for simultaneously operating all of said brake members independent of the fluid operated actuating means therefor, said manually operated means including an operating lever mounted on said truck located adjacent to the center bearing thereof.

2. A street car truck comprising side frames, a center bearing, axles and wheels on the ends of said axles and provided with brake drums, brake members cooperating with said brake drums, and manually operated means mounted entirely on said truck for simultaneously operating all of said brake members, said means including an operating lever mounted on and movable with said truck and located adjacent to the center bearing of said truck.

3. A street car truck comprising side frames, a center bearing, axles and wheels on the ends of said axles and provided with brake drums, brake members cooperating with said drums, a cam shaft for operating each brake, a rock shaft journaled on said truck adjacent to the center bearing thereof, and link connections between said rock shaft and the cam shaft for each brake, whereby all of said brakes are adapted to be actuated simultaneously by oscillating said rock shaft.

4. A street car truck comprising side frames, a center bearing, axles, and wheels on the ends of said axles and provided with brake drums, brake members cooperating with said drums, a cam shaft for operating each brake, a rock shaft journaled on said truck adjacent to the center bearing thereof, link connections between said rock shaft and the cam shaft for each brake, and a lever on said rock shaft adjacent to said center bearing whereby all of said brakes are adapted to be actuated simultaneously by oscillating said rock shaft.

5. A street car truck comprising side frames, axles and wheels on the ends of said axles and provided with brake drums, brake members cooperating with said brake drums, horizontal cam shafts journaled on said truck and operatively engaging each brake to actuate the same, a rock arm on each of said cam shafts, a rock lever pivotally mounted on each side frame of said truck intermediate said axles, link connections for rotating the rock lever on one side of said truck and the rock arms on the cam shafts for the brakes on the same side of said truck, a rock shaft extending crosswise of the truck, and link connections between said rock shafts and the rock levers on each side of said truck.

6. A street car truck comprising side frames, a center bearing, axles, axle housings and wheels on the ends of said axles and provided with brake drums, brake members cooperating with said brake drums, horizontal cam shafts journaled on said housings and operatively engaging the brake members for each brake drum, a rock member on each cam shaft, fluid operated means for simultaneously operating all of said rock members, and manually operated means for simultaneously operating all of said rock members, said manually operated means comprising a rock lever pivotally mounted on each side frame of said truck intermediate said axles, link connections between the lever on one side of said truck and the rock members on the same side thereof, a rock shaft mounted on said truck and extending crosswise of said truck adjacent to the center bearing thereof, and link connections between said rock shaft and the rock levers on each side of said truck, the link connections between the rock levers and the rock members on the cam shafts being arranged to permit independent operation of said fluid operating means and said manually operating means.

7. A vehicle truck comprising side frames, axles, wheels on said axles and provided with brake drums, brake members cooperating with said brake drums, rock shafts journaled on said truck and operatively engaging the respective brake members to actuate the same, an arm on each of said rock shafts, a fluid operated rod operatively connected to each arm for actuating the same, a second arm on each of said rock shafts, a pull rod for each of said second arms, a link connection between said second arm and said pull rod, said link connection preventing endwise movement of the pull rod when the fluid operated rod is operated to actuate the brake, and means for simultaneously actuating all of said pull rods.

Signed at Detroit, Michigan, this 15th day of November, 1927.

HERBERT W. ALDEN.
NELSON R. BROWNYER.